April 10, 1962 A. M. MOEN 3,029,063
BUTTERFLY VALVE
Filed Aug. 29, 1958
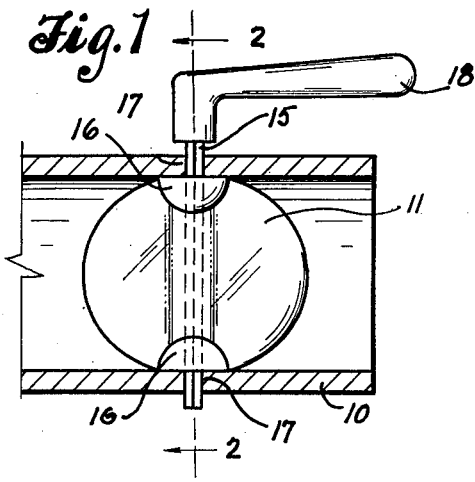
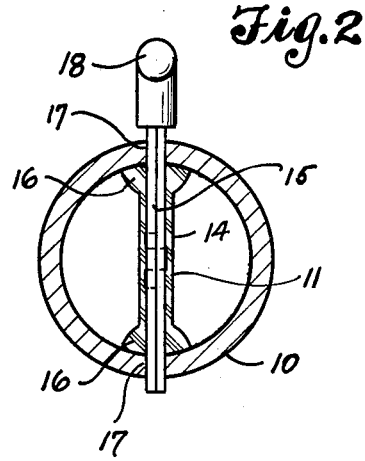
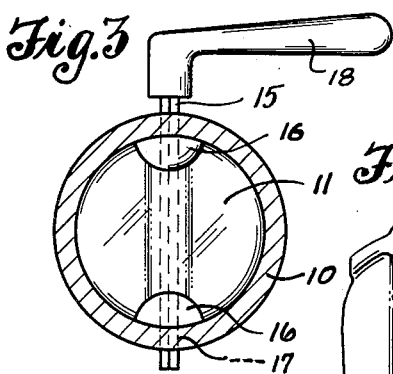
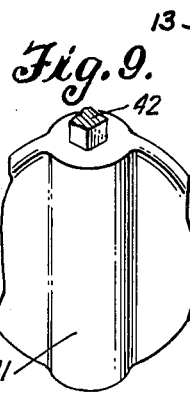
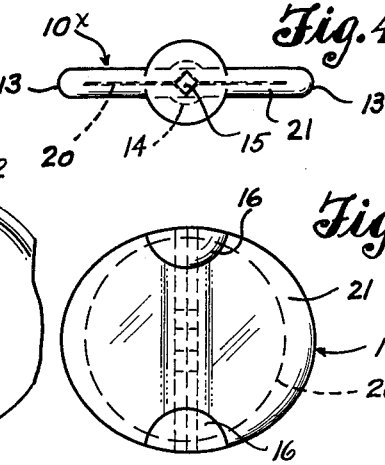
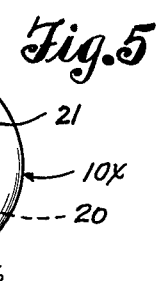
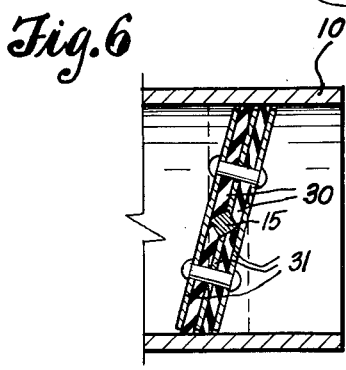
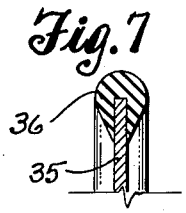
INVENTOR.
ALFRED M. MOEN
BY
Robinson & Berry
ATTORNEYS

United States Patent Office 3,029,063
Patented Apr. 10, 1962

3,029,063
BUTTERFLY VALVE
Alfred M. Moen, 151 Lakeview Drive, Grafton, Ohio
Filed Aug. 29, 1958, Ser. No. 757,967
5 Claims. (Cl. 251—306)

This invention relates to valves and it has reference more particularly to improvement in pressure retaining and flow controlling valves of the balanced "butterfly" type; it being the principal object of the invention to provide an improved form of valve, equipped with a novel form of valve disk whereby positive and complete sealing of the valve passage against flow of fluid under pressure may be effected, and whereby a flow of fluid through the valve may be controlled.

More specifically stated, the primary object of the present invention is to provide an improved butterfly valve, characterized by the fact that the valve disk is of elliptical form and is supported for opening and closing adjustment by a stem applied through it along its minor axis; also, in that the disk is formed by molding it from a flexible material, either without or with a flat metal core.

It is also an object of the invention to provide a valve member of the above character that is applicable to cylindrical housings and which measures slightly more across its major axis than the diameter of the valve housing within which it is applied, thus providing that when turned to a tightly closed position, the compressing effect against its end portions will cause slight expansion in the direction of its minor axis, and thus effect a tightly sealed joint about its entire periphery.

Still further objects and advantages of the invention reside in the details of construction and combination of parts embodied by the valve, as will hereinafter be fully described.

In accomplishing the above mentioned and other objects, I have provided the improved details of construction, the preferred forms of which are illustrated in the accompanying drawings, wherein:

FIG. 1 is a sectional view taken through a valve housing, in its axial direction, as equipped with a valve disk embodied by the present invention; the valve disk being shown in its open position.

FIG. 2 is a cross-section of the valve taken on line 2—2 in FIG. 1.

FIG. 3 is a cross-section of the valve showing the valve disk in closed position.

FIG. 4 is a top edge view of the valve disk as equipped with a metal core.

FIG. 5 is a face view of the valve disk of FIG. 4.

FIG. 6 is a cross-sectional view of a valve housing containing a valve disk of an alternative form.

FIGS. 7 and 8 are sectional details of valve disks of other alternative forms.

FIG. 9 is yet another modification showing a valve disk of elliptical form with the valve turning stem extended along its major axis.

Referring more in detail to the drawings:

In FIGS. 1, 2 and 3, reference numeral 10 designates a cylindrical valve housing in which an adjustable valve element 11 is mounted for opening and closing movements. In the present specification, the valve element 11 will be designated as the "valve disk." The valve housing 10 here shown may be a part of a cylindrical duct or pipe, such as used to conduct gas, water or other fluids, or it might be a cylindrical valve housing equipped at its end with means whereby pipe sections may be joined in the usual way thereto.

The valve disk 11, as it is shown in FIGS. 1, 2 and 3, is molded of rubber, or any other suitable material having like characteristics, to the elliptical form shown in FIG. 1. The peripheral edges of the disk are rounded, as has been shown at 13 in FIG. 4, and it is formed across its minor axis with a thickened reinforcing rib-like portion 14 through which a metal mounting stem 15 is passed. At the upper and lower ends of this thickened reinforcing portion 14, the disk is formed with enlarged, semi-spherical hubs 16—16 which provide ample surfaces about the stem that bear flatly against the inner surface of the housing 10 as will be understood by reference to FIG. 2.

It is further noted that the stem 15 extends rotatably through openings 17—17 formed through the housing walls and at its upper end the stem is equipped with a handle 18 for adjustment and control of the valve disk.

The valve element 11 is slightly elliptical in form and must be slightly deformed along its minor axis for mounting in the housing 10. When mounted in the cylindrical housing 10, it measures slightly more along its major axis than the diameter of the housing 10 in which it is contained. Therefore, when the disk is turned to and is tightened in a closed position, substantially at a right angle to the axis of the housing 10, it will be deformed in the direction of its major axis to circular form. This deforming causes expanding forces to be applied in the direction of its minor axis, thus forcing the hub portions 16—16 more tightly into sealing contact with the housing immediately about the openings 17—17 through which the stem 15 extends.

In the alternative form of construction shown in FIGS. 4 and 5, the valve disk 10x comprises a flat, disk shaped metal core 20 somewhat lesser in diameter than the inside diameter of housing 10 in which the valve disk will be used. This core disk is encased in a rubber shell 21 molded to the same elliptical form as that shown in FIG. 1. The rubber projects beyond the peripheral edges of the disk 20 to substantial extent as indicated in FIG. 5. This valve disk is adapted to be equipped with a mounting stem 15 and handle 18 and may be applied to a valve housing and operated in the same manner as the valve disk of the valve shown in FIG. 1.

The alternative valve disk construction shown in FIG. 6 comprises a plurality of valve rubbers 30 of the same elliptical form of the valve shown in FIG. 1, that are clamped between metal disks 31. The rubber 30 would correspond in function to that of the disk 11 of FIG. 1, while the disks 31 would conform in size and function to the metal disk of FIG. 5. This valve disk, as comprised of the parts 30 and 31, would in use, be equipped with a stem, of the character shown on FIG. 2 and would be applied to a valve housing 10 and used in the same manner as therein shown.

Yet another modification or alternative has been illustrated in FIG. 7 wherein 35 designates a metal valve disk, corresponding to disk 20 of FIG. 5, equipped with mounting stem and handle in a like manner. This disk 35 has a channeled rubber ring 36 fitted about its periphery; the ring 36 being so shaped as to provide a valve disk of the elliptical form, and having the same sealing effect as the valve disks of FIGS. 1, 5 or 6 when applied to a housing 10.

The alternative form of valve disk shown in FIG. 8 employs paired disks 38—38 of metal with a rubber sealing bead 39 clamped between their peripheral edges. This bead gives the disk the elliptical form of the disk of FIG. 5, and the disk would, to prepare it for use, be equipped with mounting stem and handle as in FIG. 1.

Valves of the kind above disclosed are relatively inexpensive; they effect liquid and gas tight seals and will retain liquids and gases under high pressure. They may be opened in either direction from the closed position of FIG. 5, and at any position are balanced.

The feature of such valve disks resides in the fact that they are of the elliptical form and are so mounted that when closed tightly they will be deformed in the direction of their major axis, thus to effect a tight seal about their entire peripheries. This is the case regardless of the specific details of construction.

The form of valve disk shown in FIG. 9 embodies the principles of those previously described but in this instance the disk, which is designated by numeral 40, has been formed with a cylindrical hub portion 41 mounting a valve stem 42. The diameter of the disk is such that it must be deformed lengthwise of the hub for its proper placement in the valve housing. This increase is such that the hub portions are always under substantial compression and prevent leakage in these areas where leakage is most apt to occur when the valve is closed. The closing of the valve also slightly deforms the disk along an axis perpendicular to the stem to insure against leakage. This type has the advantage of a better holding of the valve when set in any open position and an easier turning of the valve in making adjustments.

What I claim as new is:

1. A valve structure comprising a cylindrical housing, the housing having diametrically opposed openings therein, a valve disk within the housing and having diametrically opposed openings therein, operating means extending through the openings in the housing and engaging the openings in the valve disk, the valve disk when positioned in the housing being of oval form and having a minor axis coaxial with the diametrically opposed openings, the valve disk having an enlarged portion of resilient deformable material about each opening therein and adjacent the periphery of the disk, the valve disk having a resilient deformable peripheral edge portion leading into the enlarged portions, the valve disk having a major axis when in position in the housing of a greater diameter than the interior diameter of the housing, the enlarged portions engaging and sealing the operating means and openings of the housing at all times, whereby upon turning the valve disk from open to closed position the edge portion thereof is progressively deformed from the enlarged portions to the major axis thereby effecting a tightly sealed valve entirely about its periphery with increased sealing about the enlarged portions.

2. A valve structure as recited in claim 1, wherein the valve disk is composed of a plurality of flat circular metal disks of lesser diameter than the internal diameter of the cylindrical housing and having between the disks and about the periphery thereof the resilient deformable material and forming a composite structure having a diameter greater than the internal diameter of the cylindrical housing.

3. A valve structure as recited in claim 1, wherein the valve disk is composed of at least one flat circular metal plate of lesser diameter than the internal diameter of the housing having the resilient deformable material molded thereon about the peripheral portion, the composite structure having a diameter greater than the internal diameter of the housing.

4. A valve structure as recited in claim 1, wherein the valve disk comprises a flat circular metal disk having a diameter lesser than the internal diameter of the housing and having molded entirely thereabout the resilient deformable material the peripheral edge of which is of a greater diameter than the internal diameter of the housing.

5. The valve structure of claim 1 wherein a flat, rigid plate of lesser diameter than the cylindrical housing is embedded within the valve disk concentrically thereof.

References Cited in the file of this patent

UNITED STATES PATENTS

| 1,188,462 | McCormack | June 27, 1916 |
| 2,385,510 | Harwood | Sept. 25, 1945 |
| 2,488,380 | Danks | Nov. 15, 1949 |
| 2,772,850 | Eaton | Dec. 4, 1956 |
| 2,782,801 | Ludwig | Feb. 26, 1957 |

FOREIGN PATENTS

| 1,130,544 | France | of 1957 |